Patented May 4, 1948

2,440,801

UNITED STATES PATENT OFFICE 2,440,801

PROCESS OF REACTING HYDROGEN CHLORIDE WITH OLEFINIC COMPOUNDS, AND PRODUCT

William E. Hanford and Jesse Harmon, Wilmington, Del., assignors to E. I. du Pont de Nemours & Company, Wilmington, Del., a corporation of Delaware No Drawing. Application June 17, 1942, Serial No. 447,430

12 Claims. (Cl. 260—464)

This invention relates to a telomerization reaction. More specifically, it relates to a telomerization reaction which results in the production of new compounds from hydrogen chloride and compounds having ethylenic unsaturation.

In copending application Serial No. 438,466, filed April 10, 1942, a novel chemical reaction has been disclosed. The reaction has been called "telomerization" (from Greek telos, meaning "end" plus Greek mer meaning "part"). "Telomerization" is defined as the process of reacting, under polymerization conditions, a molecule YZ which is called a "telogen" with more than one unit of a polymerizable compound having ethylenic unsaturation called a "taxogen" to form products called "telomers" having the formula Y(A)$_n$Z wherein (A)$_n$ is a divalent radical formed by chemical union, with the formation of new carbon bonds of the taxogen, the unit A being called a "taxomon," $n$ being any integer greater than one, and Y and Z being fragments of the telogen attached to the terminal taxomons.

The reaction of olefinic compounds with hydrogen chloride to give simple addition products is well known in the art. It is, furthermore, well known that vinyl compounds can be polymerized by the action of certain catalysts such as peroxides, persulfates, metal alkyls, etc., at elevated temperatures. It is known that the molecular weight of the polymers may be lowered to a certain extent by carrying out the polymerization at elevated temperatures or in the presence of certain foreign substances, such as organic solvents, aldehydes, organic or mineral acids, or large excesses of catalyst. However, it has previously not been known that olefinic compounds could be reacted with hydrogen chloride to produce chlorides containing more than one unit of the olefinic compound.

It is an object of this invention to produce new chemical compounds. Another object is to provide a process for reacting hydrogen chloride with more than one unit of an olefinic compound to produce telomers. A further object is to discover suitable conditions for this reaction. Other objects will appear hereinafter.

The objects have been accomplished by the discovery that hydrogen chloride will react with more than one unit of an olefinic compound in the presence of water, when subjected to the action of a telomerization catalyst, to produce telomers. The reaction can be expressed by the following equation:

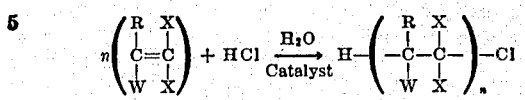

wherein $n$ is an integer greater than one, X is a member of the group consisting of hydrogen and halogen, W is a member of the group consisting of hydrogen, halogen, and methyl, and R is a member of the group consisting of hydrogen, halogen, alkyl, aryl, aralkyl, —CN, —COOH, —OH, —CHO, —C—O—R', —COOR', and

R' being alkyl.

This reaction results in telomers having fragments of the hydrogen chloride; i. e., H— and —Cl, as the terminal atoms and having several taxomon units resulting from the condensation of the taxogen; i. e., the olefinic compound, between said terminal atoms. A given reaction results in a mixture of products which have different molecular weights and which differ in the number of taxomon units in the molecule. In other words, the products differ in the numerical value of $n$. By suitable control of the reaction conditions, the average value of $n$ can be controlled. In this way, products of very short chain length, moderate chain length, or long chain length can be obtained.

The catalyst, which has been termed a telomerization catalyst, is any agent which is effective as a catalyst for the polymerization of vinyl compounds, but which is ineffective as a catalyst for the Friedel-Crafts reaction; e. g., peroxygen compounds, molecular oxygen, metal alkyls, etc.

In carrying out the reaction of a specific olefinic compound with hydrogen chloride under the present invention, it is necessary that due regard be given to the competing reactions which may take place. The products of this invention, H(A)$_n$Cl, contain a certain amount of the simple addition product in which $n$ is equal to 1. This by-product is formed in increasing amounts, as the concentration of hydrogen chloride, in the reaction mixture is increased. Nevertheless, for successful operation of the process, it is necessary that the hydrogen chloride be present in appreciable concentration; i. e., at least 5 per cent based on the weight of taxogen employed. Water is a constituent of the reaction mixture. Since the hydrogen chloride is, for the most part, dissolved in aqueous phase, it is also necessary that it be not too greatly diluted by the water; hence, the quantity of water employed should be such that the concentration of the hydrochloric acid with respect to the water is not much less than 5 per cent by weight. The relative amount of water used may be considerably less, so that the concentration of hydrochloric acid with respect to the water may be as great as 50 per cent or even higher.

The exact procedure to be used varies considerably with the properties of the monomer employed. Thus, with low-boiling monomers such as ethylene and vinyl chloride, it is necessary that the reaction be carried out under pressure in order to obtain the necessary concentration of monomer for telomerization. In all cases, good dispersion is desired and this may be attained simply by shaking or vigorous stirring of the reaction mixture. The process may be aided by the addition of dispersing agents. The exact temperatures and pressure ranges to be employed vary also with the catalyst. In general, the conditions to be used are those which, in the absence of the hydrogen chloride, would cause the formation of polymer in the presence of the catalyst employed. Thus, for benzoyl peroxide, suitable temperatures vary from 50° C. to 150° C. For persulfates, similar temperatures are suitable, while, for metal alkyls, higher temperatures on the order of 200° C. are sometimes necessary. Conditions for the emulsion polymerization of vinyl compounds with various catalysts are abundantly described in the art, and these conditions will, in general, be suitable for carrying out this telomerization process.

No special grade of reagent is required. In fact, it has been found in some cases that small amounts of substances which are generally regarded as polymerization inhibitors may be present without interfering with the reaction.

In order that the process may be more fully understood, the following specific examples in which parts are by weight are given by way of illustration, but the invention is not limited thereto as will become more apparent hereinafter.

*Example I*

Seventy (70) parts of allyl chloride, 100 parts of concentrated (37 per cent) hydrochloric acid, and 1 part of benzoyl peroxide are placed in a pressure reactor lined with an acid-resistant alloy of nickel, molybdenum, and iron. The reactor is closed and placed in a mechanism designed to produce vigorous agitation of the contents by shaking the reactor. The mixture is then heated to a temperature of 100° C. during agitation for 11 hours. After cooling to room temperature, the reactor is opened and the products are discharged. The organic layer is separated from the aqueous layer and washed with water and 5 per cent sodium bicarbonate solution to remove the excess hydrochloric acid. It is then dried over magnesium sulfate, filtered, and distilled. After removal of the unreacted allyl chloride, 25 parts of higher boiling products remain.

By fractional distillation, this mixture is separated into the following fractions:

| Fraction | Boiling Point | Per Cent of Product |
|---|---|---|
| 1 | 94–96.5° C./760 mm | 25 |
| 2 | 147° C./100mm. or 92° C./10 mm | 45 |
| 3 | Higher boiling liquid residue | 30 |

Fraction 1 consists of the by-product 1,2-dichloropropane. Fraction 2 is a trichlorohexane, $C_6H_{11}Cl_3$. Due to its tendency to split out hydrogen chloride upon distillation, the values for chlorine content and molecular weight may be slightly lower than those calculated for this formula; for example, chlorine, 54.54 per cent (calculated for $C_6H_{11}Cl_3$, 56.11 per cent), molecular weight, 170 (calculated, 189.5). The molecule consists of 2 units of allyl choride in combination with 1 molecule of hydrogen chloride, $$H(C_3H_5Cl)_2Cl$$

The refractive index of the liquid is 1.4790 at 25° C.; at 25° C., the density is approximately 1.2084.

The residue, fraction 3, consists of higher molecular weight chlorides, formed by the combination of 3 or more units of allyl chloride with a molecule of hydrogen chloride.

*Example II*

One hundred (100) parts of styrene and 100 parts of concentrated (37 per cent) hydrochloric acid are placed in a reactor fitted with an efficient stirrer and a return condenser. The mixture is then stirred vigorously to disperse the styrene in the acid, heated to the reflux temperature (103–104° C.), and 0.5 part of benzoyl peroxide is added. The stirring and heating are continued for 10 hours at the end of which time the mixture is allowed to cool. The organic phase and the water phase separate into 2 layers. The heavier hydrochloric acid layer is drawn off from the bottom. The organic layer is then stirred with water to extract any excess hydrochloric acid. It is then subjected to steam distillation to remove any unreacted monomer along with the by-product, alpha-chloroethyl benzene. When the quantity of water-insoluble material distilling over with the steam becomes negligible, the steam distillation is stopped. The oil which remains in the distillation vessel is quite fluid at the temperature of the boiling water, but, upon cooling, it becomes more viscous. The sticky, highly viscous liquid (40 parts), when separated from the water and dried, contains 4.75 per cent chlorine. The average molecular weight of the product, 747, can be calculated directly from the chlorine content since each molecule contains 1 atom of chlorine. The product is thus a mixture of compounds of the formula $H(C_8H_8)_nCl$ in which the average chain length $n$ is 6.7 styrene units.

The unreacted monomer which was removed by the steam distillation may be used again in the process to improve the overall yield, with or without first removing the alpha-chloroethyl benzene. Alternately, the reaction may be run for a longer period, adding more benzoyl peroxide from time to time to improve the yield further.

The stirring is important. When a run similar to that described above is carried out with less efficient stirring, such that the dispersion is not uniform and the mixture tends to separate into layers, the product obtained is much more viscous and less sticky. It contains but 2.98 per cent chlorine, corresponding to an average molecular weight of 1190 or an average chain length, $n$, of 11.1 styrene units per molecule.

If commercial 50 per cent styrene (in xylene) containing hydroquinone as an inhibitor is used in the above process in place of pure styrene, a product of higher molecular weight results. The chlorine content of the telomer, 1.77 per cent, corresponds to an average molecular weight of 2000.

*Example III*

The following example illustrates the use of ethylene in accordance with the invention.

In a pressure reactor lined with an acid-resistant alloy of nickel, molybdenum, and iron is placed 50 parts of water, 50 parts of concentrated (37 per cent) hydrochloric acid, specific gravity, 1.188, and 0.5 part of benzoyl peroxide, the liquid charge occupying approximately ¼ of the total internal volume of the reactor. The reactor is closed and placed in a reciprocating agitator, and ethylene is admitted to a pressure of 200 atmospheres. The temperature is then raised to 100° C. and additional ethylene is introduced to bring the pressure to 500 atmospheres; as the pressure falls due to the reaction, ethylene is intermittently added from a storage vessel to maintain a range of 400–500 atmospheres. The sum of the individual pressure drops occurring between additions of ethylene during 4.5 hours is 385 atmospheres. In an additional 2 hours, the fall in pressure is only 5 atmospheres; and the pressure then remains constant, indicating that the reaction is complete. The reactor is cooled and the ethylene is bled off before discharging the product. The oily white liquid is taken up in ether, separated from the aqueous phase, and washed with 5 per cent sodium bicarbonate solution and water. The ether solution is filtered to remove the insoluble part of the product, dried, and stripped of ether by distillation through a column. The 40 parts of higher boiling material which remains is distilled through an efficient fractionating column, first at atmospheric pressure, and then in vacuum. The mixture is thereby sharply separated into its pure components, as follows:

|  | Per cent |
|---|---|
| n-Butyl chloride | 5 |
| n-Hexyl chloride | 5 |
| n-Octyl chloride | 8 |
| n-Decyl chloride | 9 |
| n-Dodecyl chloride | 7 |
| n-Tetradecyl chloride | 5 |
| n-Hexadecyl chloride | 4 |
| n-Octadecyl chloride | 6 |
| n-Eicosyl chloride | 5 |
| Higher alkyl chlorides (residue) | 40 |
| Total | 94 |

The alkyl chlorides are characterized by their boiling points, and their identity is confirmed by determination of the refractive index and chlorine content. The residue of higher alkyl chlorides is a soft grease which is found to contain 7.0 per cent chlorine. From this, the average composition is calculated to be $C_{33}H_{67}Cl$.

The ether-insoluble portion (6 parts) of the product which is filtered off before the distillation is a soft white wax. It contains 6.11 per cent chlorine which corresponds to an average composition of $C_{38}H_{77}Cl$.

*Example IV*

Oxygen in low concentrations acts as a catalyst for the reaction, but the preferred operating temperature is higher than that for benzoyl peroxide.

One hundred (100) parts of 18.5 per cent aqueous hydrochloric acid is placed in a reactor lined with an acid-resistant alloy of nickel, molybdenum, and iron. The charge occupies approximately ¼ of the total internal volume of the reactor, and, since the remainder of the space is filled with air at the time of the closing, the charge also includes approximately 0.0086 part of oxygen. Ethylene is then admitted to a pressure of 200 atmospheres, and the mixture is heated to a temperature of 200° C. Additional ethylene is then admitted to raise the pressure to 930 atmospheres, and, at intervals thereafter, to maintain a pressure in the neighborhood of 900 atmospheres. At the end of 3 hours, a total drop in pressure of 125 atmospheres has been noted. The reactor is allowed to cool, and the product is discharged. It is a mobile liquid (8 parts) consisting of a mixture of straight-chain primary alkyl chlorides having an even number of carbon atoms, the major part of which are volatile with steam.

*Example V*

The reaction is also promoted by the alkyl and aryl derivatives of the heavy metals.

A reactor is charged with 100 parts of 9.25 per cent aqueous hydrochloric acid and 1 part of lead tetraphenyl. It is closed and evacuated, and ethylene is then admitted to a pressure of 200 atmospheres. The reaction is then carried out at a temperature of 200° C. and ethylene pressures in the neighborhood of 900 atmospheres. After 2 hours, the reactor is allowed to cool and the product is discharged. It is a soft grease (4 parts) consisting of a mixture of alkyl chlorides, about ⅔ of which is soluble in ether and ⅓ of which is wax-like and insoluble in ether.

*Example VI*

The following example illustrates the use of vinyl cyanide in accordance with the invention. Along with the simple addition of hydrogen chloride, which is always a competing reaction, another side reaction is encountered in this case; namely, hydrolysis of the vinyl cyanide.

Twenty-six (26) parts of vinyl cyanide, 100 parts of concentrated (37 per cent) hydrochloric acid, and 0.25 part of benzoyl peroxide are placed in a reactor fitted with a mechanical stirring device and a return condenser, and the reactor is quickly heated by the application of steam to the outside. After heating during vigorous stirring for approximately 1 hour, a solid product begins to separate. After an additional half hour, the quantity of solid separating becomes considerable and very little vinyl cyanide is left in the reaction mixture, so the heating is discontinued. The solid is filtered off and washed thoroughly with water to remove the soluble monomeric products. (These consist principally of beta-chloropropionic acid and ammonium chloride, formed by hydrolysis and addition of hydrogen chloride to the vinyl cyanide.) The insoluble portion of the product is ground thoroughly with water and filtered several times to complete the washing process. The highly insoluble solid (3 parts) is found to contain 2.00 per cent chlorine. From this, the molecular weight, 1772, may be calculated since each molecule contains 1 atom of chlorine. The nitrogen content of 20.82 per cent shows that the cyano groups have been partially hydrolyzed in the process, since the calculated value for H(C₃H₃N)₃₂.₈Cl is 25.9 per cent nitrogen.

By this process, hydrogen chloride can be reacted with any compound containing an ethylenic double bond; for example, unsaturated hydrocarbons, such as ethylene, propylene, styrene, etc.; halogenated olefins, such as vinyl chloride, vinylidene chloride, trichloroethylene, tetrachloroethylene, and allyl chloride; vinyl esters, such as vinyl acetate and vinyl benzoate; vinyl ketones, such as methyl vinyl ketone; vinyl ethers; N-vinyl compounds; unsaturated acids and their derivatives, such as acrylic acid, acrylonitrile, and methyl methacrylate; and unsaturated aldehydes and alcohols, such as acrolein and allyl alcohol. Two (2) or more of these olefinic compounds may be reacted simultaneously with the hydrogen halide to form products (intertelomers) containing molecules made up of the elements of both monomers in combination with the hydrogen halide. The preferred ethylenic compounds for use in this invention are those containing a vinyl group. These can be represented by the formula

wherein R is hydrogen or another monovalent group.

The reaction of the present invention does not occur in the absence of a telomerization catalyst. The catalysts used in the process of this invention are agents which are effective as catalysts for the polymerization of vinyl compounds and which agents are, at the same time, ineffective as catalysts for the Friedel-Crafts reaction. It must be specifically understood that the process of the present invention is not related to the Friedel-Crafts type reactions and that the Friedel-Crafts type catalysts, such as aluminum chloride, boron trifluoride, sulfuric acid, and hydrofluoric acid, are inoperative for the present process. While the agents used in the present reaction are commonly spoken of as catalysts, it is thought that they do not act as an inert catalyzing agent such, for example, as carbon black, but that they take part in the reaction in some way. In fact, it may be that a better term for these agents would be reaction promoters. However, since reaction promoters have been called catalysts so generally in the art, and since the mechanics of the present process are not clearly established, the term "catalyst" has been employed herein.

Both polymerization of vinyl compounds and Friedel-Crafts reactions with these same type compounds are so well known that any one skilled in the art will be able, without difficulty, to select a catalyst which would be effective to promote polymerization and ineffective to promote Friedel-Crafts reaction. By way of example, however, the following suitable catalysts are mentioned: peroxygen compounds, e. g., diacyl peroxides such as acetyl peroxide, propionyl peroxide, benzoyl peroxide, and lauroyl peroxide; alkali and ammonium persulfates, perborates, and percarbonates; other peroxides such as hydrogen peroxide, ascaridole, tetrahydronaphthalene peroxide, diethyl peroxide, and cyclohexanone peroxide; molecular oxygen; such metal alkyls as tetraethyl lead and tetraphenyl lead; ultraviolet light, especially in the presence of such photosensitizers as mercury, alkyl iodides, benzoin, and acetone; amine oxides, e. g., trimethylamine oxide, triethylamine oxide, and dimethyl analine oxide; dibenzoyl hydrazine; hydrazine salts such as hydrazine dihydrochloride and hydrazine sebacate; and hexachloroethane. The telomerization catalyst is used in amounts varying from about 0.0001 to 1.0 per cent by weight of the telogen, the preferred range in the case of the peroxygen catalysts being 0.05 to 0.5 per cent.

Of this group of catalysts, it is preferred to use peroxygen compounds, especially the diacyl peroxides. The other member of the preferred group of catalysts is molecular oxygen, which may be considered a special case of this group. It should be emphasized, however, that, to be effective as a catalyst, molecular oxygen must be present in small quantity, such as, for example, less than 1000 parts per million. As is generally the case in peroxide-catalyzed vinyl polymerizations, oxygen in larger quantities than this acts as an inhibitor for the reaction.

This telomerization reaction can be carried out over a wide range of temperatures, from room temperature to over 250° C. In fact, the upper temperature limit for telomerization is determined only by the thermal stability of the various compounds in the reacting system. The preferred temperature for any given telomerization depends primarily on the catalyst and the telogen being employed. For the majority of cases, the preferred reaction temperature lies somewhere in the range of 50–150° C. The preferred catalysts, such as the diacyl peroxides and the persulfates, are generally employed in this temperature range, and the preferred classes of telogens react satisfactory under such conditions. High temperatures are generally employed only with less active telogens and catalysts which are more heat stable than those of the preferred class. Telomerizations with less active catalysts and telogens sometimes require temperatures of the order of 150–250° C. Thus, with lead tetraphenyl or molecular oxygen, a temperature in the neighborhood of 200° C. is preferred.

As has been previously pointed out, water is essential to the successful operation of the generic process. However, in the specific case where ethylene is the taxogen, water may be dispensed with, although its presence is highly desirable.

The reaction medium may also contain an organic solvent as well as water. This may dissolve the organic phase only (hydrocarbons, chlorinated hydrocarbons, etc.) or it may be soluble in the water, effecting a partial solution of the organic phase in the water (alcohol, dioxane, etc.).

The ratio of telogen to taxogen used in telomerization can be varied widely. In general, increasing the ratio of telogen to taxogen decreases the average molecular weight of the product. The preferred molecular ratio of telogen to taxogen will depend upon the nature of the reactants and the chain length of the product desired, but will generally be in the range of 10:1 to 1:10. It must be emphasized that the average chain length of the telomer, i. e., the number of taxomon units, is a function of the concentration of taxogen which is maintained in the reaction system, and, when the taxogen is a gas, this is dependent on the reaction pressure. Moreover, the average chain length of the telomer in a given reaction also depends on the nature of the taxogen employed, some taxogens being more active than others. The telogen, hydrogen chloride, should amount to at least about 5 per cent based on the weight of the taxogen. Preferably, the hydrogen chloride is present in amounts of from 10 per cent to 1000 per cent based on the weight of the taxogen. It can be present in higher concentration, see Example VI.

It is sometimes desirable to add one or both of the reactants to the system as the reaction progresses. This can be done by injection of the vapor or liquid into the reaction system by well known means. It is also feasible to add a catalyst to the system as the reaction progresses. This can be accomplished, for example, by injecting a solution of the catalyst in one of the reactants or in an inert solvent. This procedure is especially advantageous in those cases where the reaction takes place very rapidly. In such instances, portion-wise or slow-continuous addition of the catalyst to the system facilitates the control of the reaction and generally leads to higher yields.

It is within the scope of this invention to carry out telomerization reactions in a continuous flow system. For example, a mixture of reactants and catalyst can be passed continuously through a zone which is under telomerization conditions. Alternatively, the catalyst can be injected into the system which is passing through the reaction zone. In some cases, advantage may be derived by adding one of the reactants to the mixture in the reaction zone. This is especially true when the reaction is so rapid as to cause a marked change in concentration in one of the reactants. Continuous operation possesses many technical advantages such as economy of operation, accurate control of the reaction, and flexibility of operation. By continuous operation, a constant ratio of reactants can be maintained during the reaction if so desired.

The products are valuable for a wide variety of uses, depending upon their chemical constitution. All of them contain a halogen atom, so they may be subjected to the usual reactions of organic halides to obtain alcohols, amines, nitriles, esters, etc. The products from the reaction of hydrochloric acid with ethylene are straight-chain primary alkyl chlorides, and may, depending upon the average chain length, be used as solvents, lubricants, or wax substitutes, or, in any case, as alkylating agents. The polyfunctional products obtained when substituted ethylenes are telomerized with hydrogen chloride may be employed in the preparation of tanning agents, detergents, dyestuffs, or pharmaceutical products.

It is apparent that many widely different embodiments of this invention may be made without departing from the spirit and scope thereof, and, therefore, it is not intended to be limited except as indicated in the appended claims.

We claim:

1. A mixture of compounds of the formula

wherein $n$ is a plural integer.

2. A mixture of compounds of the formula

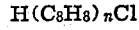

wherein $n$ is a plural integer.

3. A mixture of compounds of the formula

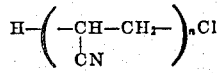

wherein $n$ is a plural integer.

4. A mixture of compounds of the formula

wherein $n$ is a plural integer and R is selected from the group consisting of aryl, haloalkyl, and cyano.

5. A process for preparing liquid to solid compounds having a chain containing a plurality of recurring

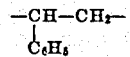

units, the two terminal valences of the chain being satisfied by H— and Cl— radicals respectively, which comprises heating a mixture comprising styrene, water, hydrogen chloride, and a peroxygen catalyst at 50–250° C., the ratio of hydrogen chloride to styrene and of hydrogen chloride to water being, in each instance, at least 1 to 20.

6. A process for preparing liquid to solid compounds having a chain containing a plurality of recurring —C$_3$H$_5$Cl— units, the two terminal valences of the chain being satisfied by H— and Cl— radicals respectively, which comprises heating a mixture comprising allyl chloride, water, hydrogen chloride, and a peroxygen catalyst at 50–250° C., the ratio of hydrogen chloride to allyl chloride and of hydrogen chloride to water being, in each instance, at least 1 to 20.

7. A process for preparing liquid to solid compounds having a chain containing a plurality of recurring

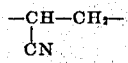

units, the two terminal valences of the chain being satisfied by H— and Cl— radicals respectively, which comprises heating, at 50–250° C., a mixture comprising vinyl cyanide, water, hydrogen chloride and a peroxygen catalyst, the ratio of hydrogen chloride to vinyl cyanide and of hydrogen chloride to water being, in each instance, at least 1 to 20.

8. A process for preparing liquid to solid compounds having a chain containing a plurality of recurring bivalent units corresponding to a polymerizable vinyl compound, the two terminal valences of the chain being satisfied by H— and Cl— radicals respectively, which comprises heating, at 50–250° C., a mixture comprising a polymerizable vinyl compound, water, hydrogen chloride and a peroxygen catalyst, the ratio of hydrogen chloride to polymerizable vinyl compound and of hydrogen chloride to water being, in each instance, at least 1 to 20.

9. A process for preparing liquid to solid compounds having a chain containing a plurality of bivalent recurring units corresponding to a polymerizable compound having an ethylenic double bond, the two terminal valences of the chain being satisfied by H— and Cl— radicals respectively, which comprises heating, at 50–250° C., a mixture comprising said polymerizable compound, water, hydrogen chloride and a peroxygen catalyst, the ratio of hydrogen chloride to polymerizable compound and of hydrogen chloride to water being, in each instance, at least 1 to 20.

10. A process for preparing liquid to solid compounds having a chain containing a plurality of bivalent recurring units corresponding to a polymerizable hydrocarbon containing a vinyl group, the two terminal valences of the chain being satisfied by H— and Cl— radicals respectively, which comprises heating, at 50–250° C., a mixture comprising said polymerizable hydrocarbon, water, hydrogen chloride and a peroxygen catalyst, the ratio of hydrogen chloride to polymerizable hydrocarbon and of hydrogen chloride to water being, in each instance, at least 1 to 20.

11. A process for preparing liquid to solid compounds having a chain containing a plurality of bivalent recurring units corresponding to a polymerizable halogenated olefine containing a vinyl group, the two terminal valences of the chain being satisfied by H— and Cl— radicals respectively, which comprises heating, at 50–250° C., a mixture comprising said polymerizable halogenated olefine, water, hydrogen chloride and a peroxygen catalyst, the ratio of hydrogen chloride to polymerizable hydrocarbon and of hydrogen chloride to water being, in each instance, at least 1 to 20.

12. A process for preparing liquid to solid compounds having a chain containing a plurality of bivalent recurring units corresponding to a polymerizable vinyl ester, the two terminal valences of the chain being satisfied by H— and Cl— radicals respectively, which comprises heating, at 50–250° C., a mixture comprising said polymerizable vinyl ester, water, hydrogen chloride and a peroxygen catalyst, the ratio of hydrogen chloride to polymerizable vinyl ester and of hydrogen chloride to water being, in each instance, at least 1 to 20.

WILLIAM E. HANFORD.
JESSE HARMON.

REFERENCES CITED

The following references are of record in the file of this patent:

UNITED STATES PATENTS

| Number | Name | Date |
|---|---|---|
| 2,058,466 | Kharasch | Oct. 27, 1936 |
| 2,303,549 | Horney | Dec. 1, 1942 |

FOREIGN PATENTS

| Number | Country | Date |
|---|---|---|
| 438,820 | Great Britain | Nov. 25, 1935 |
| 464,054 | Great Britain | Apr. 12, 1937 |

OTHER REFERENCES

Maas, "Jour. Am. Chem. Soc.," vol. 46, pages 2664–2673 (1924).

Levene, "Jour. Biol. Chem.," vol. 84, pages 571–599 (1929).

Kharasch, "Jour. Am. Chem. Soc.," vol. 55, pages 2468–2490, 2521–2530 (1933).

Brouwer, "Rec. Trav. Chim.," vol. 53, pages 1001–1010 (1934).

Ellis, "Chemistry of Petroleum Derivs.," 1934, pages 588, 589, 592–595.

Kharasch, "Jour. Am. Chem. Soc.," vol. 56, pages 712–714 (1934).

Kharasch, "Jour. Org. Chem.," vol. 2, pages 288–302 (1937).

Perkin, "Journ. Chem. Soc.," vol. 95, pages 1166–1178.

Weidel, "Monatshefte fur Chemie," vol. 11, pages 504–506.

Pechmann, "Berichte Deut. Chem. Gesell," vol. 34, pages 428–430.

Lieben, "Monatshefte fur Chemie," vol. 4, pages 32–35.

Pariselle, "Comptes Rendus," vol. 150, pages 1057–1059.

Lespiean, "Comptes Rendus," vol. 146, pages 1035–1037.